United States Patent
Li et al.

(10) Patent No.: US 10,878,628 B2
(45) Date of Patent: Dec. 29, 2020

(54) SYSTEM AND METHOD FOR CONVERTING MASSIVE, SINGLE-MATERIAL MESH DATASETS TO A HIERARCHICAL FORMAT

(71) Applicant: Cesium GS, Inc., Exton, PA (US)

(72) Inventors: Kangning Li, North Wales, PA (US); Sean Lilley, Exton, PA (US)

(73) Assignee: Cesium GS, Inc., Philadelphia, PA (US)

( * ) Notice: Subject to any disclaimer, the term of this patent is extended or adjusted under 35 U.S.C. 154(b) by 0 days.

(21) Appl. No.: 16/823,564

(22) Filed: Mar. 19, 2020

(65) Prior Publication Data

US 2020/0302689 A1 Sep. 24, 2020

Related U.S. Application Data

(60) Provisional application No. 62/822,218, filed on Mar. 22, 2019.

(51) Int. Cl.
*G06T 17/20* (2006.01)

(52) U.S. Cl.
CPC .......... *G06T 17/20* (2013.01); *G06T 2210/12* (2013.01); *G06T 2210/36* (2013.01); *G06T 2210/56* (2013.01)

(58) Field of Classification Search
CPC . G06T 17/20; G06T 2210/12; G06T 2210/36; G06T 2210/56
See application file for complete search history.

(56) References Cited

U.S. PATENT DOCUMENTS

| | | | |
|---|---|---|---|
| 6,189,130 B1* | 2/2001 | Gofman | G06F 30/398 716/55 |
| 8,681,151 B2* | 3/2014 | Coombe | G06T 17/20 345/423 |
| 10,354,434 B1* | 7/2019 | Baldwin | G06T 15/005 |
| 2006/0059494 A1* | 3/2006 | Wexler | G06F 9/5066 718/105 |
| 2008/0238919 A1* | 10/2008 | Pack | G06T 17/005 345/420 |
| 2010/0277476 A1* | 11/2010 | Johansson | G06T 17/20 345/423 |
| 2010/0283787 A1* | 11/2010 | Hamedi | G06T 17/005 345/473 |
| 2012/0207359 A1* | 8/2012 | Konukoglu | G06K 9/6277 382/128 |
| 2014/0006129 A1* | 1/2014 | Heath | G06Q 30/0222 705/14.23 |

(Continued)

OTHER PUBLICATIONS

He, T., Hong, L., Kaufman, A., Varshney, A., & Wang, S. (Oct. 1995). Voxel based object simplification. In Proceedings Visualization'95 (pp. 296-30103).*

(Continued)

*Primary Examiner* — Sarah Lhymn
(74) *Attorney, Agent, or Firm* — The Marbury Law Group, PLLC

(57) ABSTRACT

Systems, methods, devices, and non-transitory media of the various embodiments enable converting massive mesh datasets that may carry a single material to a hierarchical format. Various embodiments may provide processing efficiency and scalability in creating hierarchical format representations of massive mesh datasets and/or in rendering massive mesh datasets.

30 Claims, 14 Drawing Sheets

(56) References Cited

U.S. PATENT DOCUMENTS

| | | | |
|---|---|---|---|
| 2017/0091992 A1* | 3/2017 | Rogers | G06T 17/005 |
| 2017/0228894 A1* | 8/2017 | Deleplace | G06T 9/001 |
| 2019/0311502 A1* | 10/2019 | Mammou | G06T 17/00 |
| 2019/0325089 A1* | 10/2019 | Golparvar-Fard | G06T 7/579 |
| 2020/0118301 A1* | 4/2020 | Connelly | G06T 17/005 |
| 2020/0118330 A1* | 4/2020 | Connelly | G06F 30/13 |

OTHER PUBLICATIONS

Crassin, Cyril, Fabrice Neyret, and Sylvain Lefebvre. "Interactive gigavoxels." (2008) (p. 1-24).*

Suarez, J. P., Trujillo, A., Santana, J. M., de la Calle, M., & Gomez-Deck, D. (2015). An efficient terrain Level of Detail implementation for mobile devices and performance study. Computers, Environment and Urban Systems, 52, p. 21-33.*

Novák, J., & Dachsbacher, C. (May 2012). Rasterized bounding volume hierarchies. In Computer Graphics Forum (vol. 31, No. 2pt2, pp. 403-412). Oxford, UK: Blackwell Publishing Ltd.*

Uddin, Misbah, Rolf Stadler, and Alexander Clemm. "A bottom-up design for spatial search in large networks and clouds." International Journal of Network Management 28.6 (2018): e2041.*

Patrick John Cozzi, "Visibility Driven Out-Of-Core HLOD Rendering", Thesis in Computer and Information Science, University of Pennsylvania, 2008.

* cited by examiner

SYSTEM AND METHOD FOR CONVERTING MASSIVE, SINGLE-MATERIAL MESH DATASETS TO A HIERARCHICAL FORMAT

RELATED APPLICATIONS

This application claims priority to U.S. Provisional Application No. 62/822,218 filed on Mar. 22, 2019 entitled "System and Method For Converting Massive, Single-Material Mesh Datasets To A Hierarchical Format," the entire contents of which are hereby incorporated by reference.

BACKGROUND

Computer graphics, and especially three-dimensional visualization, is a rapidly developing computing technology finding new applications in many different industries, including geospatial, defense, and entertainment.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality three-dimensional objects can be difficult to render.

Massive mesh datasets can be difficult to work with due to the large amount of data that needs to be loaded, possibly over a network, and then processed, such as when rendered to a display. Many applications that operate on massive mesh datasets use a hierarchical-level-of-detail (HLOD) structure for the dataset, in which a large-area, but low-detail simplification of the model is placed at the highest level of the hierarchy as a tile, followed by subsequently higher-detail but smaller-area children tiles.

Efficient creation of HLODs for massive mesh datasets can be difficult for the same reason as rendering, namely a large amount of data must be loaded and processed. Current algorithms, such as vertex clustering algorithms, generate a simplification of a large mesh dataset using a constant amount of memory in a constant number of streaming passes over the data. However, generating a hierarchy of simplifications can require many streaming passes over the data in current methods. In current methods generating a sub-hierarchy of tiles that cover a small area can necessitate streaming the entire source dataset several times despite most of the data being useless to the small area. Finally, in current methods, generating efficient bounds of each tile in the hierarchy can be computationally expensive if the algorithm used is adaptive to the data, such as a strict k-dimensional tree ("k-d tree") that sorts all samples within an area along one axis and finds a median to perform each step of subdivision.

SUMMARY

The systems, methods, devices, and non-transitory media of the various embodiments may enable converting massive mesh datasets that may carry a single material to a hierarchical format. Various embodiments may provide processing efficiency and scalability in creating hierarchical format representations of massive mesh datasets and/or in rendering massive mesh datasets.

Various embodiments may include methods for generating a hierarchical-level-of-detail (HLOD) structure for a dataset. In various embodiments, the methods may include generating a voxel density map summarizing the dataset, subdividing the voxel density map into a hierarchy of bounding boxes, and determining leaf tiles based on the hierarchy of bounding boxes. In various embodiments, the methods may further include determining one or more groups of leaf tiles, and generating one or more ancestor tiles for each of the one or more groups of leaf tiles.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

Computer graphics, and especially three-dimensional visualization, is a rapidly developing computing technology finding new applications in many different industries, including geospatial, defense, and entertainment.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality objects, such as high-quality three-dimensional objects, high quality two-dimensional objects, etc., can be difficult to render. Additionally, high quality objects may not be needed in every visualization. For example, when a camera view point for a model is zoomed out sufficiently, a low-quality object may suitable for rendering. Accordingly, in visualization, especially three-dimensional visualization, it can be beneficial to create multiple versions of an object, such as a high-quality version and a low-quality version.

Textures are often used in computer graphics to increase the detail of information on the surface of triangle meshes (also referred to as simply "meshes" herein). Surface information may include base color, static light color/intensity, influence weight for deformation algorithms, and parameters for shading algorithms, such as bump mapping or subsurface scattering.

Figure 1:
FIG. 1 illustrates a textured photogrammetry model.
Figure 2:
FIG. 2 illustrates the underlying mesh of the photogrammetry model of FIG. 1.

A massive mesh dataset with a single material (referred to herein simply as a "massive mesh dataset") may include triangles of indexed vertices, all of which may share the same attributes. Attributes may include, but are not limited to, positions, texture coordinates, surface normal, vertex color, skinning weights, etc. A massive mesh dataset may also include any number of large images for use as textures, as in the case of textured photogrammetry meshes. For example, FIG. 1 illustrates a textured photogrammetry model 100 and FIG. 2 illustrates the underlying mesh 101 of the photogrammetry model 100.

Massive mesh datasets may be difficult to work with due to the large amount of data that needs to be loaded, possibly over a network, and then processed, such as when rendered to a display. Many applications that operate on massive mesh datasets use a hierarchical-level-of-detail (HLOD) structure for the dataset, in which a large-area, but low-detail simplification of the model is placed at the highest level of the hierarchy as a tile, followed by subsequently higher-detail but smaller-area children tiles. Renderers may thus choose a small number of low-detail tiles to render at far view distances.

Figure 3:
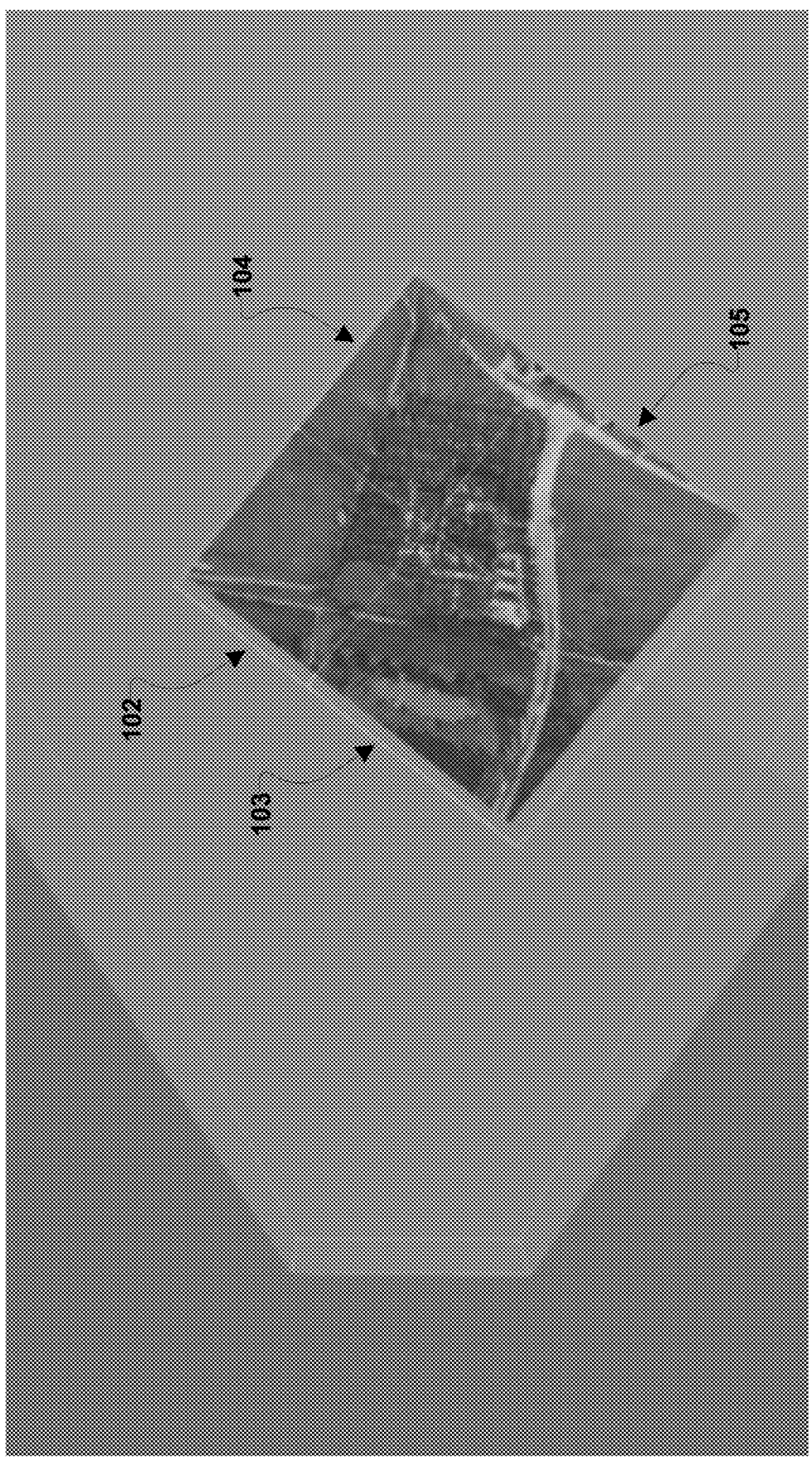
FIG. 3 illustrates an example of low-detail tiles being rendered for the photogrammetry model of FIG. 1.

FIG. 3 illustrates such an example of low-detail tiles being rendered with only four tiles 102, 103, 104, and 105 of the hierarchy of the model 100 being rendered at a far viewing distance. When rendering at near view distances, renderers no longer need to load the entire mesh dataset to display full-detail, instead only choosing tiles (i.e., the children tiles) that are likely to actually be displayed on screen. This process of only loading a subset of tiles that may be likely to actually be displayed is referred to as view culling.

Figure 4:
FIG. 4 illustrates an example of higher-detail tiles being rendered for the photogrammetry model of FIG. 1.

FIG. 4 illustrates an example of a culled view of model 100 in which the model 100 is being rendered at a viewing distance closer than that in FIG. 3. The view of FIG. 4 includes numerous tiles with more details than those in FIG. 3, while the rendered tiles in FIG. 4 only represent a sub portion (e.g., a corner portion of the building and parking lot area) of the model 100. The views in FIGS. 3 and 4, as well as other views illustrated herein, are merely examples of views used to illustrate various aspects discussed herein and other views may be substituted for the various views illustrated herein. As discussed herein, generally tiles with less detail may be higher in a HLOD (e.g., closer to the top of the hierarchy), while tiles with more detail may be further down in the HLOD (e.g., towards the bottom of the hierarchy). As there may be more detail in the tiles further down in the HLOD and there are more tiles further down in the HLOD, tiles further down in the HLOD may be referred to as "children tiles" in relation to the tiles with less detail at higher levels in the HLOD.

Efficient creation of HLODs for massive mesh datasets may be difficult for the same reason as rendering, namely a large amount of data must be loaded and processed. Current algorithms, such as vertex clustering algorithms, generate a simplification of a large mesh dataset using a constant amount of memory in a constant number of streaming passes over the data. However, generating a hierarchy of simplifications may require many streaming passes over the data in current methods. In addition, the data may not exhibit spatial locality reflecting data locality. For example, triangles or texels that are adjacent in space may be at opposite ends of a large file in the massive dataset or may be in separate files, possibly even files on separate storage mediums. Thus, in current methods generating a sub-hierarchy of tiles that cover a small area may necessitate streaming the entire source dataset several times despite most of the data being useless to the small area. Finally, in current methods, generating efficient bounds of each tile in the hierarchy may be computationally expensive if the algorithm used is adaptive to the data, such as a strict k-dimensional tree ("k-d tree") that sorts all samples within an area along one axis and finds a median to perform each step of subdivision.

The systems, methods, devices, and non-transitory media of the various embodiments may enable converting massive mesh datasets that carry a single material to a hierarchical format. The embodiment methods may provide processing efficiency and scalability in creating hierarchical format representations of massive mesh datasets and/or in rendering massive mesh datasets.

In various embodiments, an HLOD for a massive mesh dataset may be generated using a subdivision method that is adaptive to the data in the massive mesh dataset. The various embodiment method may not depend on guaranteed spatial locality of the data in the massive mesh dataset. For example, the various embodiment methods may use voxel approximate subdivisions and bottom-up tile generation to avoid the data in the massive mesh dataset needing to have guaranteed spatial locality. In various embodiments, a desired budget per tile may be selected for a massive mesh dataset. In various embodiments, a voxel density map may be generated summarizing the massive mesh dataset and the voxel density map may be subdivided to generate a hierarchy of bounding boxes. In various embodiments, candidate leaf tiles may be generated from the hierarchy of bounding boxes. In some embodiments, candidate leaf tiles larger than the desired budget per tile may be further subdivided. In various embodiments, groups of candidate leaf tiles may be simplified to generate the ancestor tiles of the groups. The various embodiments may improve data coherence when processing non-leaf tiles in the HLOD, scale for very large input datasets, and may enable parallel processing to take advantage of systems with multiple central processing units (CPUs).

Figure 5:
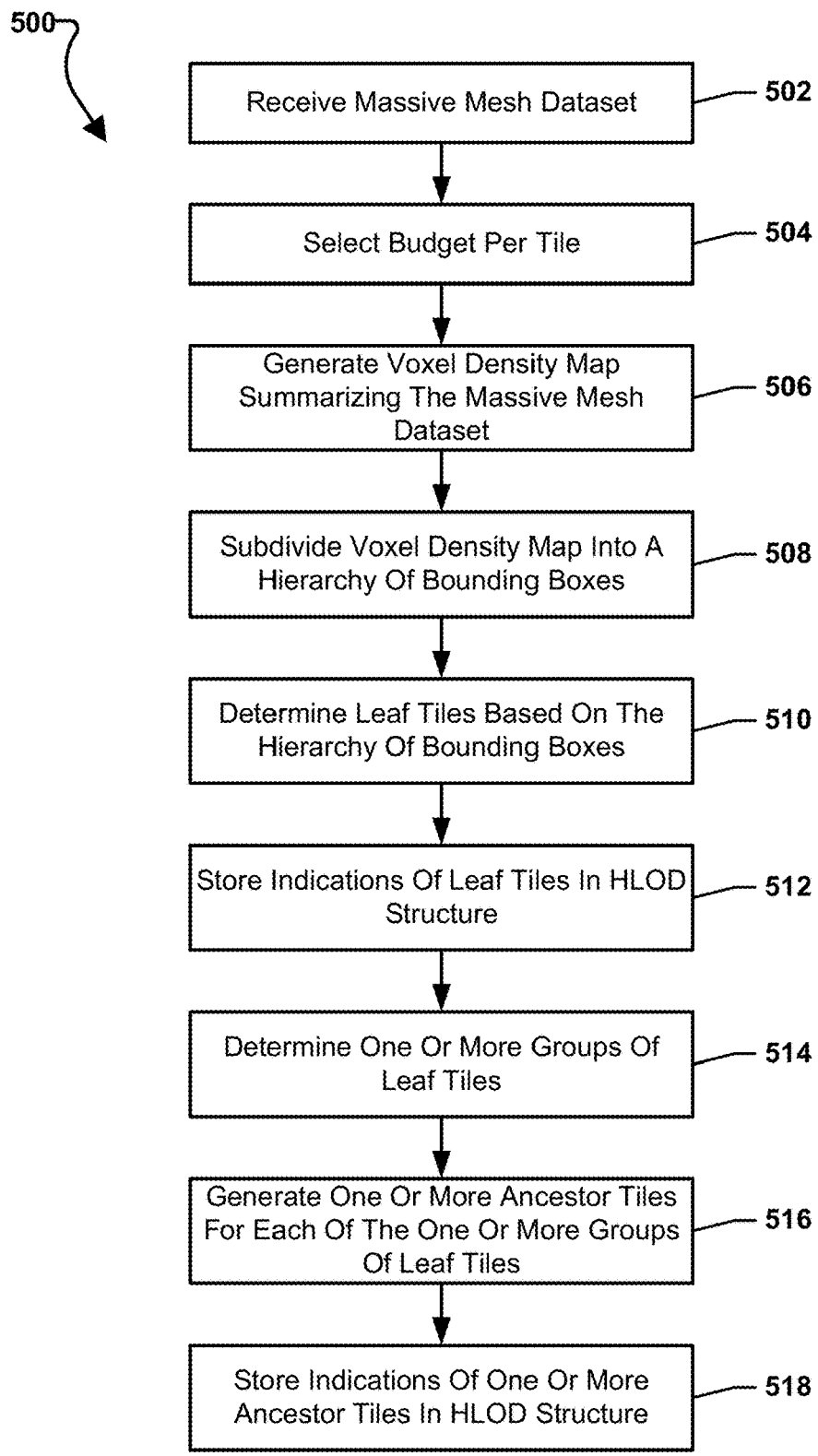
FIG. 5 is a process flow diagram illustrating an embodiment method for generating a HLOD structure for a dataset, such as a massive mesh dataset.

FIG. 5 illustrates an embodiment method 500 for generating a HLOD structure for a dataset, such as a massive mesh dataset. In various embodiments, the operations of method 500 may be performed by a component of a computing device, such as a CPU, graphics processing unit (GPU), etc. The operations of method 500 may produce an HLOD structure that may enable the dataset, such as the massive mesh dataset, to be rendered on a display. The HLOD structure may enable view culling of the massive mesh dataset by a renderer.

In block 502, the computing device may receive a massive mesh dataset. For example, the massive mesh dataset may have a single material and may include triangles of indexed vertices, all of which may share the same set of attributes. Attributes may include, but are not limited to, positions, texture coordinates, surface normal, vertex color, skinning weights, etc. A massive mesh dataset may also include any number of large images for use as textures, as in the case of textured photogrammetry meshes. As a specific example, the massive mesh dataset may be a massive mesh dataset for the photogrammetry model 100 described above with reference to FIGS. 1 and 2. In various embodiments, receiving the massive mesh dataset may include storing the massive mesh dataset in a memory location and/or receiving the massive mesh dataset over a network.

In block 504, the computing device may select a budget per tile. The budget per tile may be a data threshold such as number of bytes, number of bits, number of points, number of triangles, number of vertices, number of pixels, etc. The budget per tile may be a goal size that may represent the maximum size of any individual tile that may be created by the operations of method 500. The budget per tile may be a setting stored in a memory available to the computing device and/or may be a user defined setting indicated to the computing device. The budget per tile may be a combination of thresholds, such as a maximum number of points, maximum number of triangles, and maximum number of pixels of texture data. For example, a budget per tile may limit a tile to 65,000 vertices or less and 1024×1024 pixels of texture data or less.

In block 506, the computing device may generate a voxel density map summarizing the massive mesh dataset. In various embodiments, given the bounding box of the massive mesh dataset, the computing device may allocate a voxel grid uniformly subdividing the space represented by the massive mesh dataset into cells. In various embodiments, the resolution of the voxel grid may define a maximum possible cell count for the voxel grid. In various embodiments, the resolution of the voxel grid may be determined as part of generating the voxel density map summarizing the massive mesh dataset. For example, the resolution of the voxel grid may be determined by heuristics based on the massive mesh dataset's bounding box and data statistics, such as vertex count, triangle count, texel count, etc. As another example, the resolution of the voxel grid may be determined as a preselected size, such as a size for a voxel grid stored in a memory available to the computing device. As a further example, the resolution of the voxel grid may be determined as a preselected resolution most suitable for the voxel grid's underlying data structure. For example, the resolution of the voxel grid may be determined as a computed resolution based on a selected maximum depth and/or maximum subdivision for the final HLOD structure to be created according to the operations of the method 500. Additionally, any other method for determining the resolution of the voxel grid may be performed by the computing device.

In various embodiments, the voxel grid may be implemented in various manners, such as using three-dimensional (3D) indexed arrays, using sparse voxel octrees, using spatial hashgrids, etc. Each voxel in the voxel grid may store a count of samples corresponding to data in the massive mesh dataset, such as vertices or texels. A voxel grid may be able to summarize the massive mesh dataset's density distribution using a constant, bounded amount of memory that may be straightforward to determine up-front based on the maximum possible cell count.

In various embodiments, in response to allocating the voxel grid, the massive mesh dataset may be streamed through the voxel grid, such as by using a rasterization approach. For example, the massive mesh dataset may be streamed through the voxel grid triangle-by-triangle, position-by-position, or texel-by-texel using a rasterization approach, with each sample contributing to the voxel cell(s) that it touches in 3D space. In this manner, a 3D density map of the massive mesh dataset may be constructed that may be suitable for many data-adaptive subdivision methods.

Figure 6:
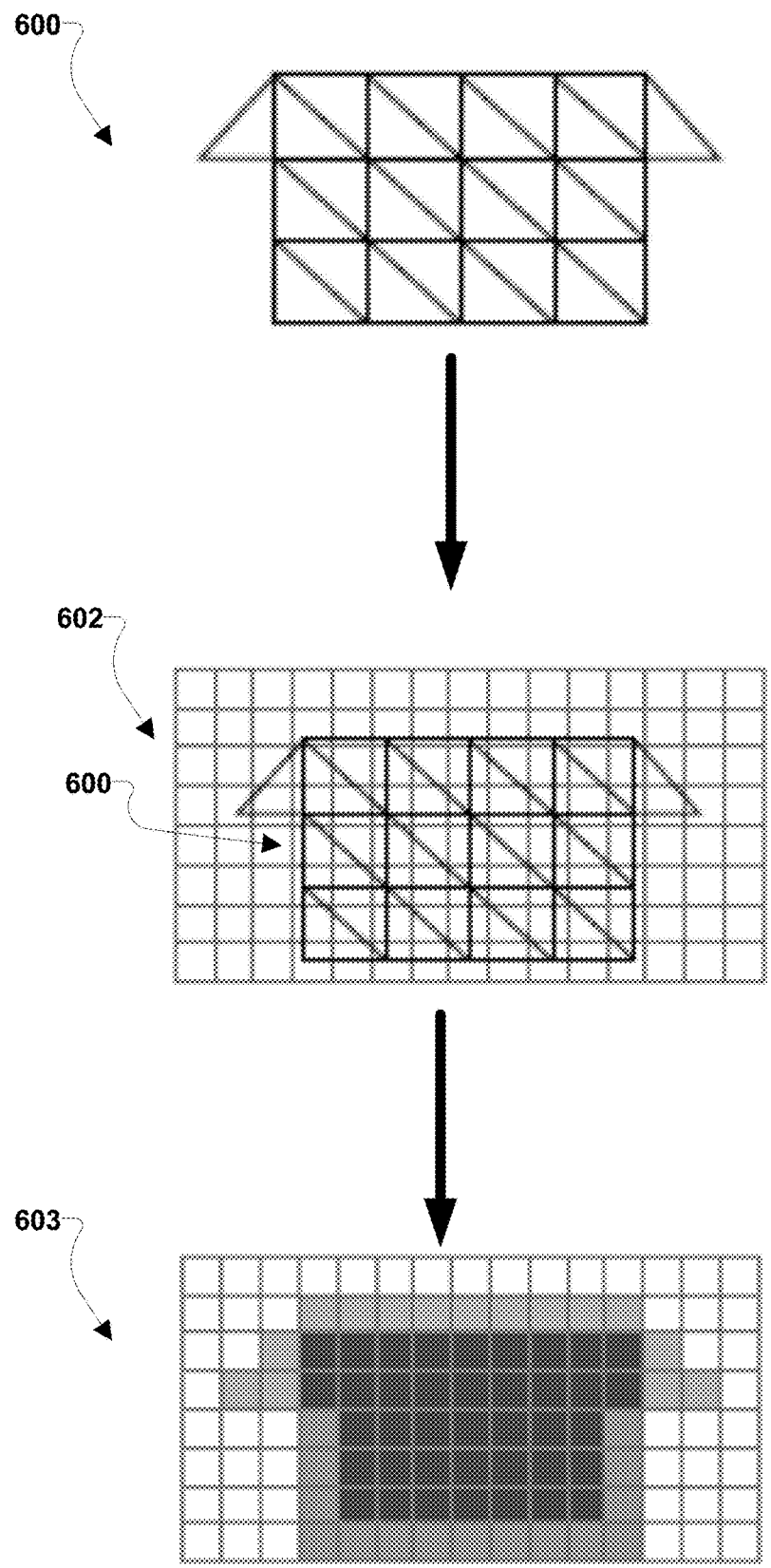
FIG. 6 illustrates an example allocation of a voxel grid uniformly subdividing the space represented by the mesh dataset into cells.

FIG. 6 illustrates an example allocation of a voxel grid 602 uniformly subdividing the space represented by the mesh dataset 600 into cells. As illustrated in FIG. 6, a triangle mesh 600 may be streamed through the voxel grid 602 to generate a voxel density map 603 of the triangle mesh 600. Different voxels in the voxel density map 603 may have different sample counts. For example, in the voxel density map 603, darker voxels may have higher sample counts than lighter voxels.

Figure 7:
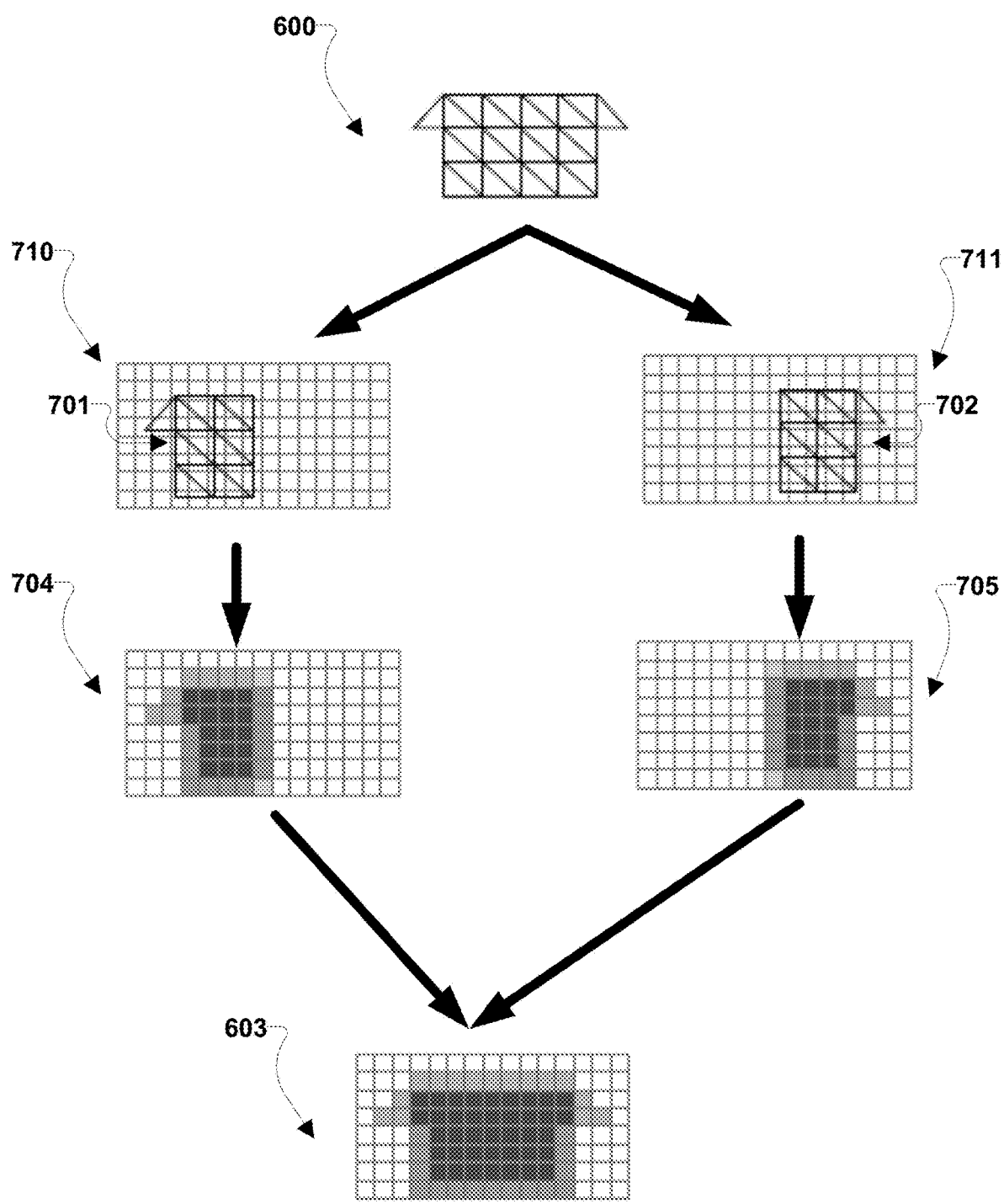
FIG. 7 illustrates an example voxelization of separate subsets of a triangle mesh in parallel.

In some embodiments, the voxel density map 603 may be constructed in parallel by streaming separate chunks of the massive mesh dataset 701, 702 through several independent voxel grids 710, 711 with identical bounding box and resolution parameters as illustrated in FIG. 7. The streaming of portions of the massive mesh dataset 701, 702 through their own respective identical independent voxel grids 710, 711 may generate multiple density maps 704, 705 that may then be merged into the voxel density map 603 by iterating over all cells that contain samples and summing the density sample in each cell with the density samples in the corresponding cells across all the grids. Constructing the voxel density map 603 in parallel may enable the computing device to leverage multiple processors, cores, other computing devices, or any other type distributed processing operations to reduce the time required to generate a voxel density map of a massive mesh dataset. For example, the computing device may assign generating density map 704 for portion 701 of the mesh 600 to a first core and may assign generating density map 705 for portion 702 of the mesh 600 to a second core.

Figure 8:
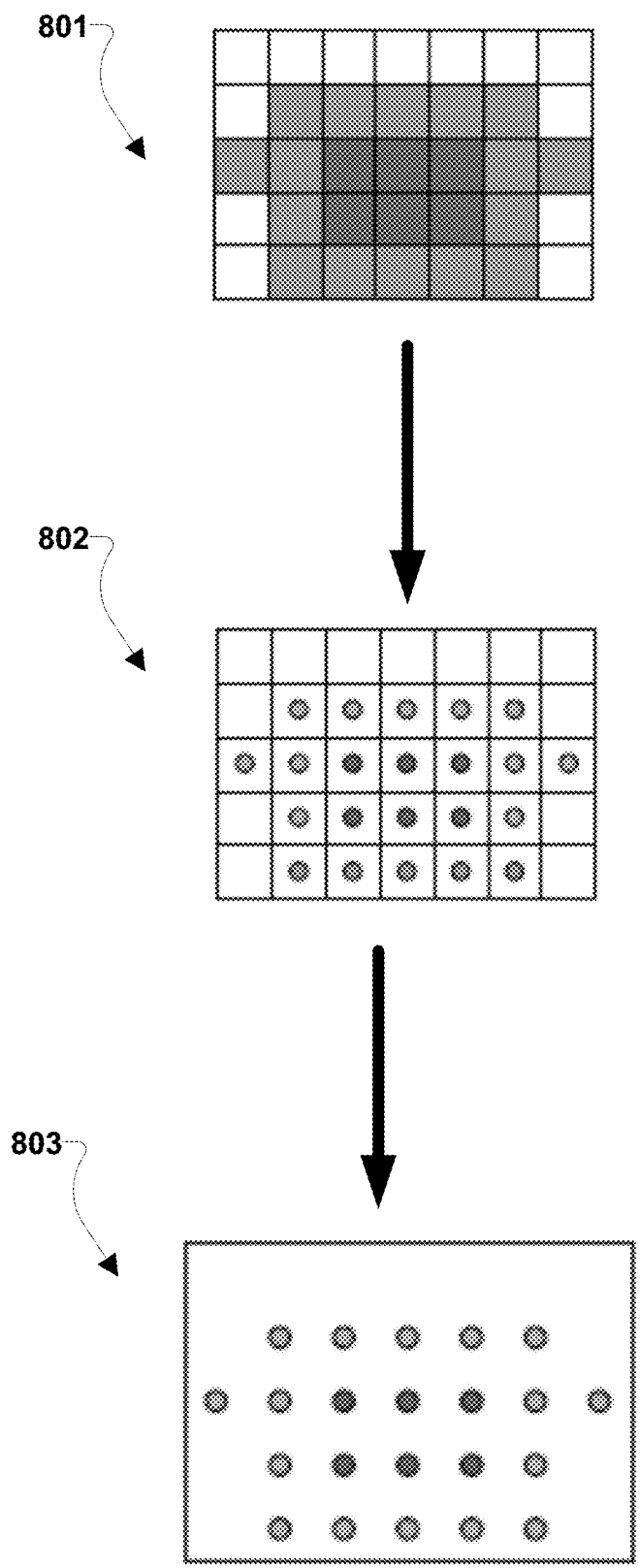
FIG. 8 illustrates point samples from a voxel grid.
Figure 9:
FIGS. 9 and 10 illustrate embodiment subdivisions of bounding boxes.
Figure 10:
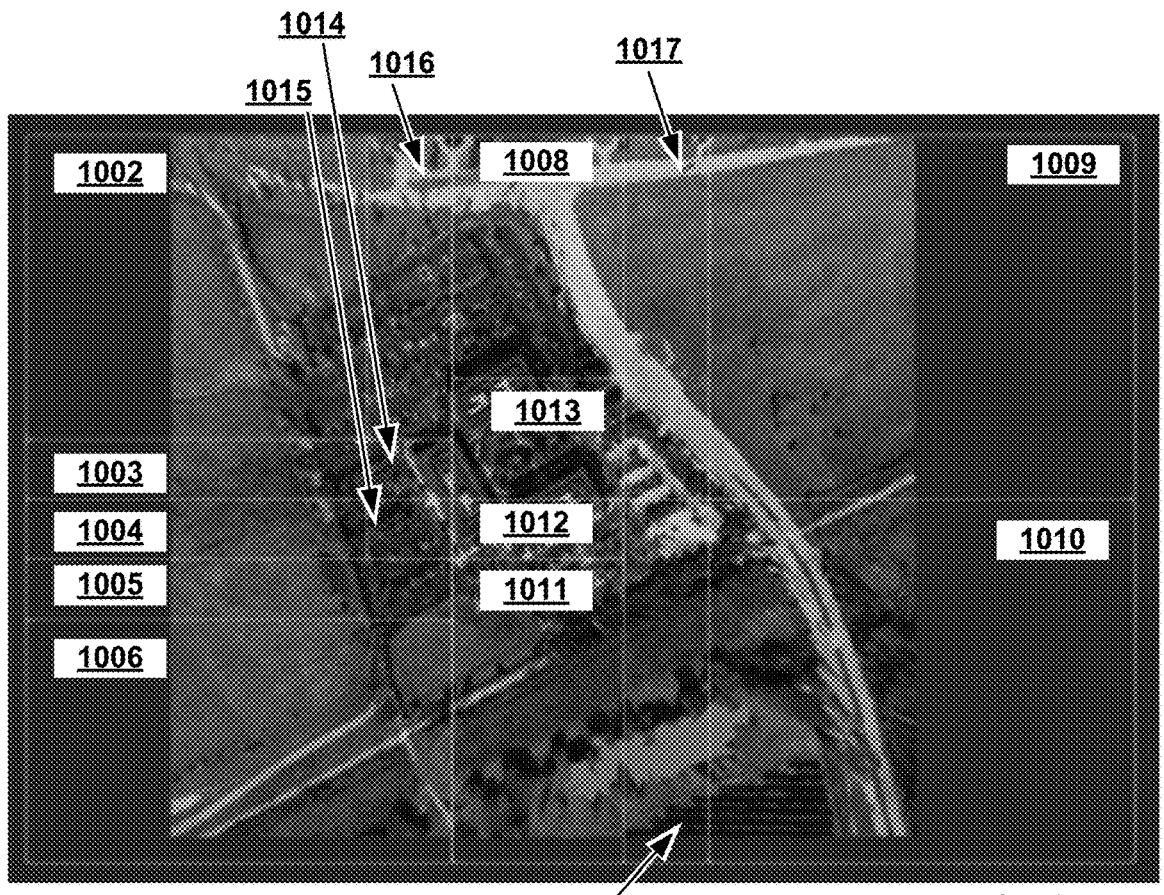

Referring back to FIG. 5, in block 508, the computing device may subdivide the voxel density map into a hierarchy of bounding boxes. In various embodiments, subdividing the voxel density map into the hierarchy of bounding boxes may include generating a pointcloud of densities based on the voxel density map and performing data adaptive subdivision on the pointcloud to generate the hierarchy of bounding boxes. In various embodiments, a pointcloud of densities may be output for the voxel density structure. For example, as illustrated in FIG. 8, the sample densities of a voxel density map 801 may be mapped to points on a voxel grid 802 and a pointcloud 803 may be generate from the points. The resulting pointcloud 803 of densities for the voxel density map may be used for data adaptive subdivision to result in a hierarchy of bounding boxes, each of which fully includes all its descendants. The assembly of all descendants across a generation may also describe the common ancestor. For example, FIG. 9 illustrates a first level of a subdivision on a massive mesh dataset into four bounding boxes 902, 903, 904, 905 and FIG. 10 illustrates descendant bounding boxes of the same area of the massive mesh dataset of the first level of the subdivision of FIG. 9. As illustrated in FIG. 10, there may be a greater number of descendant bounding boxes, such as sixteen descendant bounding boxes 1002-1017.

Figure 11:
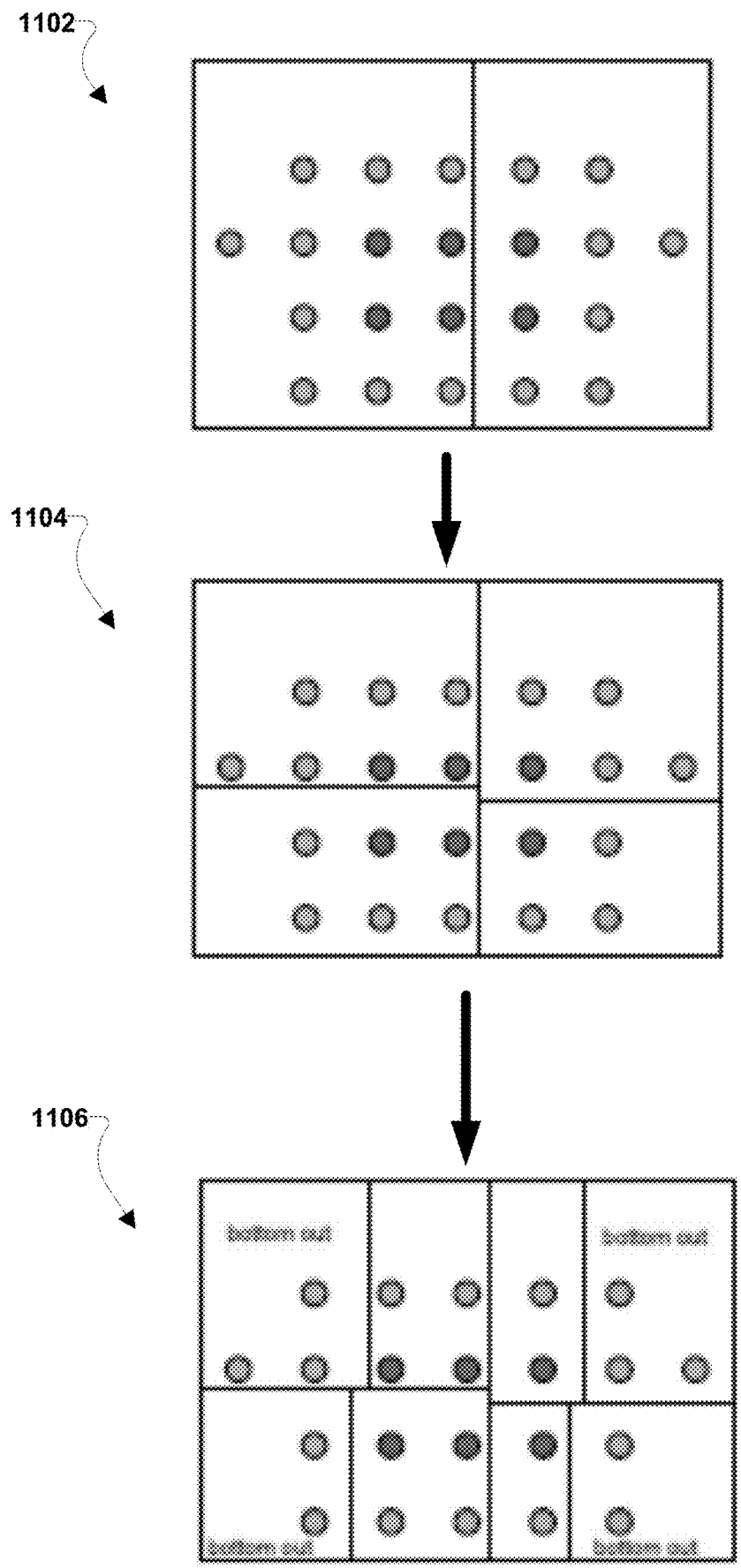
FIG. 11 illustrates an example subdivision of bounding boxes for a pointcloud.

Data adaptive methods that may be used in various embodiments include, but are not limited to, binary splits at the data median along the longest axis, binary splits with collapses between levels based on a heuristic reducing the aspect ratio of resulting bounding boxes, and centroid-based quadtree or octree splits. The subdivision process may be completed when the points within a bounding box approximately represent less than some amount of data, such as the per tile budget. For example, if each point sample carries a count for the number of vertices and texels that touched a voxel centered at the point's location in 3D space, subdivision may end when a bounding box contains three points whose summed samples indicate that the tile will likely undercut the per tile budget. FIG. 11 illustrates the iterative subdivision process stopping when each tile includes three or fewer low-density samples. For example, as illustrated in FIG. 11, the pointcloud of densities may be subdivided according to a first subdivision 1102. The first subdivision 1102 may result in each of the two bounding boxes created exceeding the per tile budget and the first subdivision 1102 may be subdivided into a second subdivision 1104 of four bounding boxes. The four bounding boxes may also exceed the per tile budget and the four bounding boxes of the second subdivision 1104 may be subdivided into eight bounding boxes in a third subdivision 1106. The third subdivision 1106 may include bounding boxes that "bottom" out when the points within the bounding boxes approximately represent less than the per tile budget amount of data.

Referring back to FIG. 5, in block 510, the computing device may determine leaf tiles based on the hierarchy of bounding boxes. In various embodiments, the leaf bounding boxes in the bounding box hierarchy may represent the bounding boxes of possible leaf tiles in the HLOD. These tiles may be referred to as candidate leaf tiles because the voxel density approximation may produce bounding volumes at the leaves of the bounding box hierarchy that enclose more data than the per tile budget, for example depending on the accuracy of the voxel density approximation. The voxel density approximation may also have been generated such that there may be sufficient resolution to produce bounding boxes that contain a manageable amount of data, but insufficient voxel resolution to create bounding boxes that likely enclose less data than the per-tile budget. A manageable amount of data may be an amount of data less than a memory handling size (e.g., an amount of data that fits in a given amount of memory). Ensuring the bounding boxes contain a manageable amount of data may ensure that the data enclosed in any bounding box may be loaded and kept in memory as the bounded data may be smaller than the memory handling size. The bounding box containing a manageable amount of data may be quick to work with as the bounding box may be fully held in the memory. However, the manageable amount of data may be an amount of data that is larger than the amount of data desired for a leaf tile.

In various embodiments, leaf tiles may not require geometry or texture simplification and may be generated from source data using processing stages including, but not limited to, clipping contained triangles to bounding boxes, generating texture atlases only containing texture information needed by the leaf, and/or data postprocessing and improvement. Data postprocessing and improvement may include, but are not limited to, vertex reordering for post-vertex transform cache efficiency, geometry compression, and/or texture compression or re-encoding. Candidate leaf tiles may be generated in batches for a given pass over the original data. Triangles from the original data may be checked against the bounding boxes of multiple candidate leaf tiles, with the number or allocation of candidate leaf tiles selected based on various factors, including the availability of memory resources, spatial locality, and/or data locality. Triangles from the original data may be checked against bounding boxes of candidate leaf tiles more efficiently by traversing the hierarchy of bounding boxes or by checking them against the voxel density map if the voxel density map has been updated such that voxels reference the leaf tiles that contain them. In the case that generating a candidate leaf tile involves data-loss operations such as geometry compression, the subset of resources required to generate the candidate leaf tile may be cached as a lossless copy.

In various embodiments, the determination of leaf tiles based on the hierarchy of bounding boxes may also be performed in parallel, such as over multiple computing devices (e.g., multiple CPUs, GPUs, etc.), multiple cores, etc., by generating different batches of candidate leaf tiles on each available computing device, core, etc.

In some embodiments, candidate leaf tile may be oversized and may require further subdivision. For example, a candidate leaf tile bigger than the per tile budget may require further subdivision. Such oversized candidate leaf tiles may be further subdivided by repeating the subdivision operations recursively or by using other methods for generating HLODs that may be more practical for smaller datasets. For example, the computing device may perform operations 502-510 recursively (or may perform operations of 502-516 recursively as further subdivision may also involve producing ancestors in some embodiments), except rather than starting with a massive mesh dataset in block 502, the operations may be performed with the oversized candidate leaf tile as the input. Further subdivision of one candidate leaf tile may be performed independent of further subdivision of another candidate leaf tile, thus enabling the further subdivision of candidate leaf tiles to be performed in parallel, such as over multiple computing devices (e.g., multiple CPUs, GPUs, etc.), multiple cores, etc., enabling further subdividing of different candidate leaf tiles simultaneously.

In block 512, the computing device may store indications of the leaf tiles in a HLOD structure. In this manner, once the final set of candidate leaf tiles is determined, the leaf tiles may be stored in a HLOD structure describing the leaf tiles. For example, the HLOD structure may be stored in a memory available to the computing device.

In block 514, the computing device may determine one or more groups of leaf tiles. For example, the computing device may determine groups of leaf tiles that may represent all of the descendants of a common ancestor tile. In some embodiments, a single pass over the massive mesh dataset as represented by the groups of leaf tiles by a single processor may be used to determine groups of leaf tiles. As the leaf tiles in aggregate represent the original dataset with no loss of data, but with improved spatial coherence, generating ancestors from leaf tiles may be more efficient in comparison to generating ancestors from the original dataset.

Figure 12:
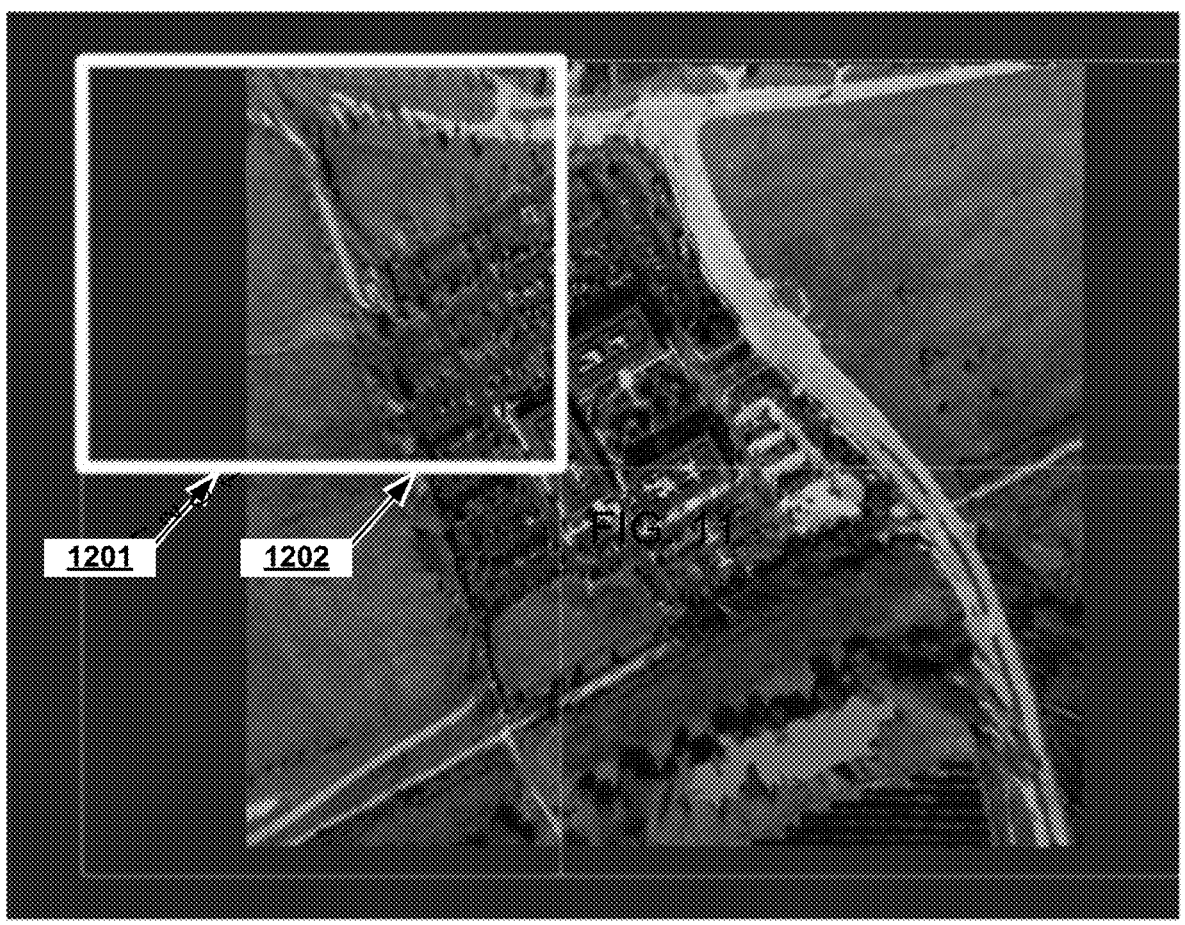
FIG. 12 illustrates an example of a low level of detail ancestor tile.
Figure 13:
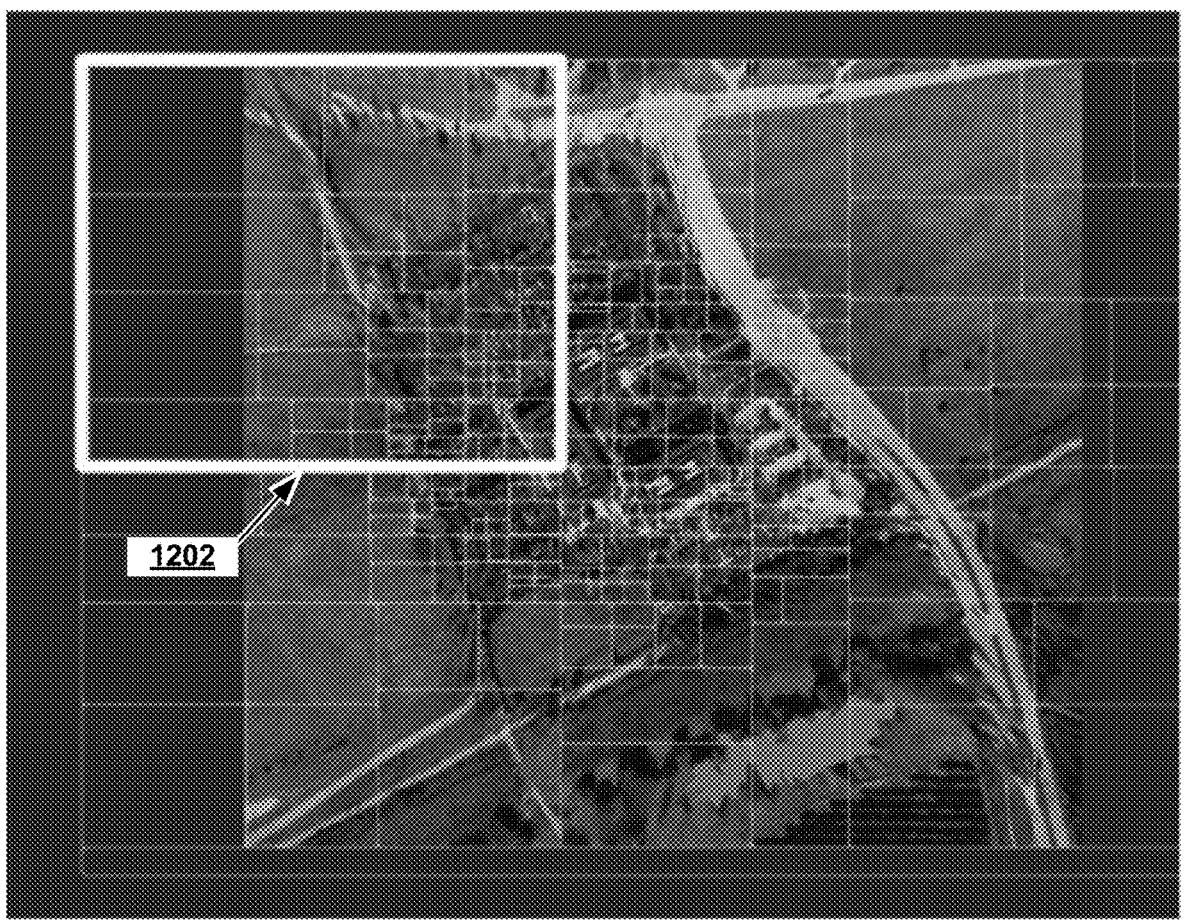
FIG. 13 illustrates an example of the leaf tiles forming the ancestor tile of FIG. 12.

In block 516, the computing device may generate one or more ancestor tiles for each of the one or more groups of leaf tiles. Ancestor tiles of candidate leaf tiles may cover areas that are precisely covered by their descendant leaf tiles, such that generating ancestor tiles using methods such as vertex clustering and voxel texture baking may be accomplished by using their candidate leaf tiles as input. For example, FIG. 12 illustrates an ancestor tile 1201 covering the area 1202. FIG. 13 shows the same area 1202 with the many leaf tiles that as a group were used to generate the ancestor tile 1201 of area 1202. As illustrated in FIGS. 12 and 13, the descendant candidate leaf tiles may include information at source resolution but may only cover the area of the ancestor, and, therefore, loading the candidate leaf tiles to generate the ancestor may result in no wasted data as compared to if data was read from the original dataset. Generating ancestor tiles may also be performed in parallel, such as over multiple computing devices (e.g., multiple CPUs, GPUs, etc.), multiple cores, etc., as multiple ancestor tiles may be generated independently of each other when loading data from candidate leaf tiles. Therefore, multiple ancestors may be generated simultaneously using different computing resources. Multiple ancestors may also be generated simultaneously within a single computing device in a constant number of passes over the candidate leaf tiles. For example, an ancestor and several consecutive generations above the candidate leaf tiles may be generated simultaneously within a single computing device in a constant number of passes over the candidate leaf tiles. Specifically, as each triangle from an original dataset may be checked for applicability to multiple ancestors before that triangle may be released from the single processor's memory, a single pass may enable an ancestor and several consecutive generations above the candidate leaf tiles to be generated simultaneously within the single processor in a single pass over the candidate leaf tiles. Some embodiments may also include generating ancestors by using closer descendants than their descendant candidate leaf tiles in cases where artifacts as a result of repeated simplification may not be a concern. In some embodiments, the computing device may perform operations 502-516 recursively as further subdivision of oversized leaf tiles may involve producing ancestors of true leaf tiles produced from an oversized leaf tile.

In block 518, the computing device may store indications of the one or more ancestor tiles in the HLOD structure. In this manner, once the final set of ancestor tiles is determined, the ancestor tiles may be stored in a HLOD structure describing the leaf tiles. For example, the HLOD structure may be stored in a memory available to the computing device. In this manner, the highest level of detail leaf tiles and the lowest level of detail ancestor tiles derived therefrom, may all be stored in the same HLOD structure.

Figure 14:
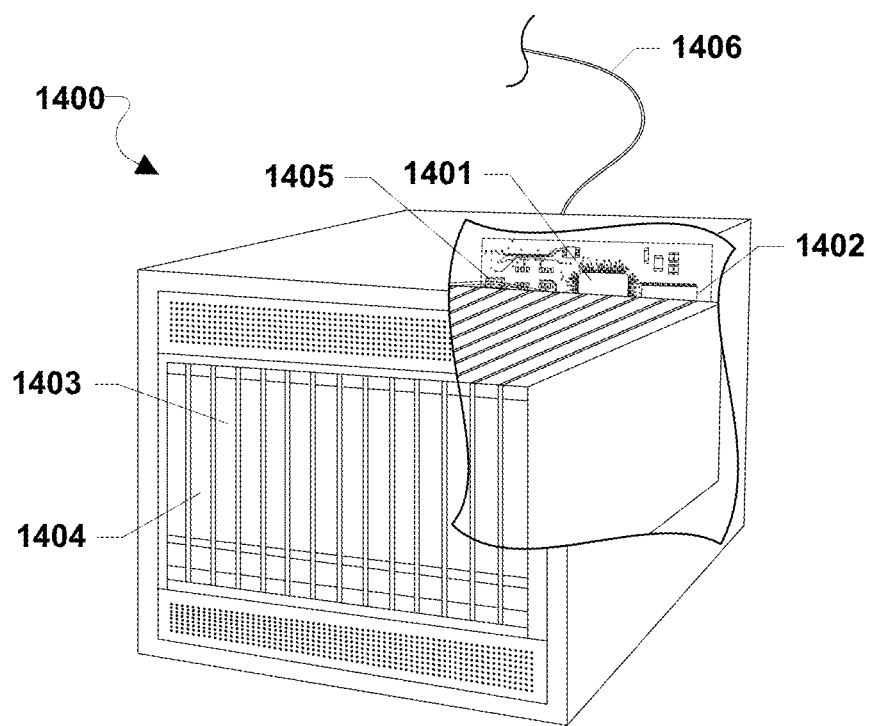
FIG. 14 is a component block diagram of a server that is a computing device suitable for use in the various embodiments.

The various embodiment methods may be performed partially or completely on a variety of computing devices, such as a server. Such embodiments may be implemented on any of a variety of commercially available server devices, such as the server 1500 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1405 coupled to the processor 1401 for establishing data connections with a network 1406, such as a local area network coupled to other broadcast system computers and servers. The processor 1401 may be any programmable microprocessor, microcomputer or multiple processor chip or chips that may be configured by software instructions (applications) to perform a variety of functions, including the functions of the various embodiments described above. Typically, software applications may be stored in the internal memory 1402, 1403 before they are accessed and loaded into the processor 1401. The processor 1401 may include internal memory sufficient to store the application software instructions.

Figure 15:
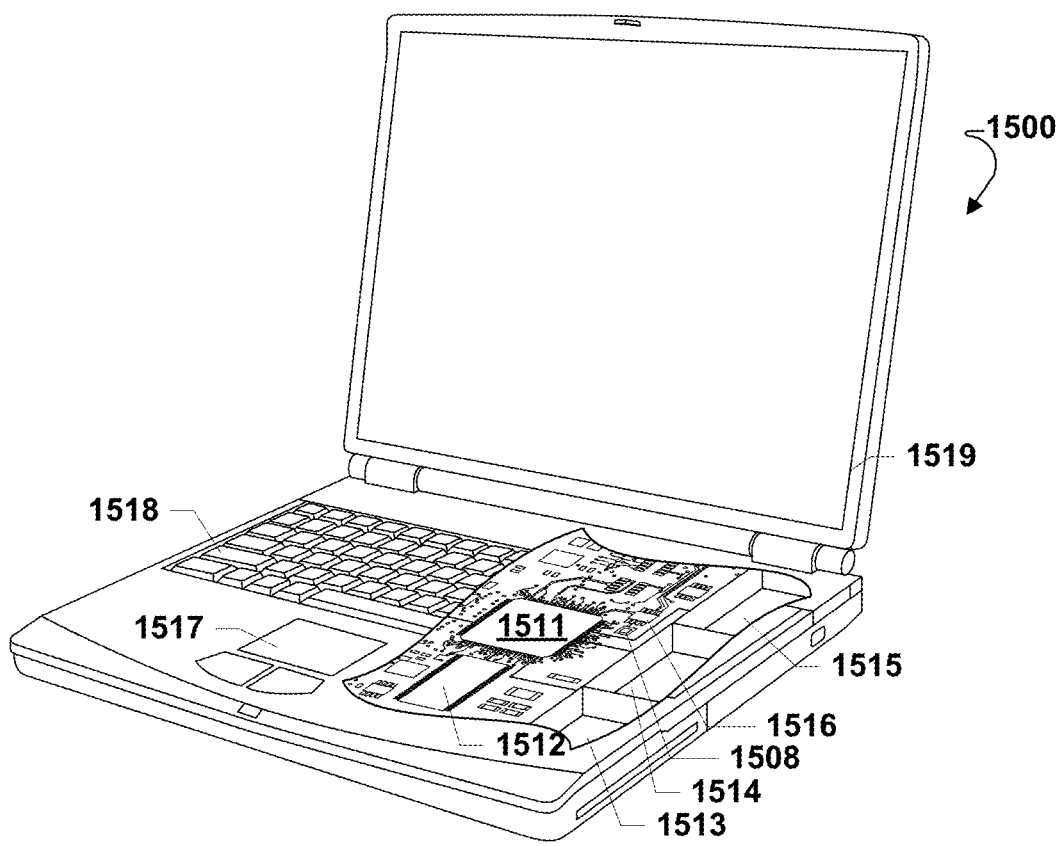
FIG. 15 is a component block diagram of a laptop that is a computing device suitable for use in the various embodiments.

The various embodiments described above may also be implemented within a variety of computing devices, such as a laptop computer 1500 illustrated in FIG. 15. Many laptop computers include a touchpad touch surface 1517 that serves as the computer's pointing device, and thus may receive drag, scroll, and flick gestures similar to those implemented on mobile computing devices equipped with a touch screen display and described above. A laptop computer 1500 will typically include a processor 1511 coupled to volatile memory 1512 and a large capacity nonvolatile memory, such as a disk drive 1513 of Flash memory. Additionally, the computer 1500 may have one or more antennas 1508 for sending and receiving electromagnetic radiation that may be connected to a wireless data link and/or cellular telephone transceiver 1516 coupled to the processor 1511. The computer 1500 may also include a floppy disc drive 1514 and a compact disc (CD) drive 1515 coupled to the processor 1511. In a notebook configuration, the computer housing includes the touchpad 1517, the keyboard 1518, and the display 1519 all coupled to the processor 1511. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for generating a hierarchical-level-of-detail (HLOD) structure for a dataset, comprising:
   generating a voxel density map summarizing the dataset, wherein the voxel density map comprises a voxel grid having a resolution lower than the dataset and each voxel in the voxel grid stores a sample count of data points within an area of the dataset associated with that voxel, and wherein the sample count of data points relates to graphics features of the dataset;
   subdividing the voxel density map into a hierarchy of bounding boxes; and
   determining leaf tiles based on the hierarchy of bounding boxes.

2. The method of claim 1, further comprising:
   determining one or more groups of leaf tiles;
   generating one or more ancestor tiles for each of the one or more groups of leaf tiles; and
   storing both the one or more groups of leaf tiles and the generated one or more ancestor tiles together in the HLOD structure.

3. The method of claim 2, further comprising:
   generating a consecutive generation of leaf tiles associated with at least one of the one or more groups of leaf tiles,
   wherein determining the one or more groups of leaf tiles, generating the one or more ancestor tiles for each of the one or more groups of leaf tiles, and generating the consecutive generation of leaf tiles are performed in a single pass over the dataset such that at least one of the one or more ancestor tiles is generated simultaneously with the consecutive generation of leaf tiles.

4. The method of claim 2, wherein:
   the one or more groups of leaf tiles comprises at least a first group of leaf tiles and a second group of leaf tiles;
   the one or more ancestor tiles comprise at least a first ancestor tile for the first group of leaf tiles and a second ancestor tile for the second group of leaf tiles; and
   two different processors are used to generate the first ancestor tile and second ancestor tile separately in parallel.

5. The method of claim 1, wherein determining leaf tiles based on the hierarchy of bounding boxes comprises:
   determining whether a candidate leaf tile exceeds a selected budget per tile; and
   subdividing the candidate leaf tile into two or more smaller leaf tiles in response to determining the candidate leaf tile exceeds the selected budget per tile.

6. The method of claim 1, wherein generating the voxel density map summarizing the dataset comprises:
   allocating the voxel grid having the resolution lower than the dataset; and
   streaming the dataset through the voxel grid using a rasterization approach to generate the voxel density map such that each voxel in the voxel grid stores the sample count of data points within the area of the dataset associated with that voxel.

7. The method of claim 6, wherein the graphics features of the dataset are streamed through the voxel grid triangle-by-triangle, position-by-position, or texel-by-texel.

8. The method of claim 1, wherein generating the voxel density map summarizing the dataset comprises generating the voxel density map in parallel processes associated with respective portions of the dataset, the parallel processes occurring on different processors, by:
  generating two independent voxel grids with the resolution lower than the dataset;
  streaming a first portion of the dataset through one of the two independent voxel grids on the first processor in parallel with streaming a second portion of the dataset through the other of the two independent voxel grids on the second processor to thereby generate a first voxel density map summarizing the first portion of the dataset and a second voxel density map summarizing the second portion of the dataset; and
  merging the first voxel density map summarizing the first portion of the dataset with the second voxel density map summarizing the second portion of the dataset to create the voxel density map summarizing the dataset.

9. The method of claim 1, wherein subdividing the voxel density map into the hierarchy of bounding boxes comprises:
  generating a pointcloud of densities based on the voxel density map; and
  performing data adaptive subdivision on the pointcloud to generate the hierarchy of bounding boxes.

10. The method of claim 1, wherein the dataset is a massive single material mesh dataset.

11. A computing device, comprising:
  a graphic display; and
  a processor connected to the graphic display, wherein the processor is configured with processor executable instructions to perform operations comprising:
    generating a voxel density map summarizing a dataset for which a hierarchical-level-of-detail (HLOD) structure is to be generated, wherein the voxel density map comprises a voxel grid having a resolution lower than the dataset and each voxel in the voxel grid stores a sample count of data points within an area of the dataset associated with that voxel, and wherein the sample count of data points relates to graphics features of the dataset;
    subdividing the voxel density map into a hierarchy of bounding boxes; and
    determining leaf tiles based on the hierarchy of bounding boxes.

12. The computing device of claim 11, wherein the processor is configured with processor executable instructions to perform operations further comprising:
  determining one or more groups of leaf tiles;
  generating one or more ancestor tiles for each of the one or more groups of leaf tiles; and
  storing both the one or more groups of leaf tiles and the generated one or more ancestor tiles together in the HLOD structure.

13. The computing device of claim 12, wherein the processor is configured with processor executable instructions to perform operations further comprising generating a consecutive generation of leaf tiles associated with at least one of the one or more groups of leaf tiles, and
  wherein the processor is configured with processor executable instructions to perform operations such that determining the one or more groups of leaf tiles, generating the one or more ancestor tiles for each of the one or more groups of leaf tiles, and generating the consecutive generation of leaf tiles are performed in a single pass over the dataset such that at least one of the one or more ancestor tiles is generated simultaneously with the consecutive generation of leaf tiles.

14. The computing device of claim 12, wherein the processor is configured with processor executable instructions to perform operations such that:
  the one or more groups of leaf tiles comprises at least a first group of leaf tiles and a second group of leaf tiles;
  the one or more ancestor tiles comprise at least a first ancestor tile for the first group of leaf tiles and a second ancestor tile for the second group of leaf tiles; and
  two different processors are used to generate the first ancestor tile and second ancestor tile separately in parallel.

15. The computing device of claim 11, wherein the processor is configured with processor executable instructions to perform operations such that determining leaf tiles based on the hierarchy of bounding boxes comprises:
  determining whether a candidate leaf tile exceeds a selected budget per tile; and
  subdividing the candidate leaf tile into two or more smaller leaf tiles in response to determining the candidate leaf tile exceeds the selected budget per tile.

16. The computing device of claim 11, wherein the processor is configured with processor executable instructions to perform operations such that generating the voxel density map summarizing the dataset comprises:
  allocating the voxel grid having the resolution lower than the dataset; and
  streaming the dataset through the voxel grid using a rasterization approach to generate the voxel density map such that each voxel in the voxel grid stores the sample count of data points within the area of the dataset associated with that voxel.

17. The computing device of claim 16, wherein the processor is configured with processor executable instructions to perform operations such that the graphics features of the dataset are streamed through the voxel grid triangle-by-triangle, position-by-position, or texel-by-texel.

18. The computing device of claim 11, wherein the processor is configured with processor executable instructions to perform operations such that generating the voxel density map summarizing the dataset comprises generating the voxel density map in parallel processes associated with respective portions of the dataset, the parallel processes occurring on different processors, by:
  generating two independent voxel grids with the resolution lower than the dataset;
  streaming a first portion of the dataset through one of the two independent voxel grids on the first processor in parallel with streaming a second portion of the dataset through the other of the two independent voxel grids on the second processor to thereby generate a first voxel density map summarizing the first portion of the dataset and a second voxel density map summarizing the second portion of the dataset; and
  merging the first voxel density map summarizing the first portion of the dataset with the second voxel density map summarizing the second portion of the dataset to create the voxel density map summarizing the dataset.

19. The computing device of claim 11, wherein the processor is configured with processor executable instructions to perform operations such that subdividing the voxel density map into the hierarchy of bounding boxes comprises:
  generating a pointcloud of densities based on the voxel density map; and
  performing data adaptive subdivision on the pointcloud to generate the hierarchy of bounding boxes.

20. The computing device of claim 11, wherein the dataset is a massive single material mesh dataset.

21. A non-transitory processor readable medium having stored thereon processor-readable instructions configured to cause a processor of a computing device to perform operations comprising:
  generating a voxel density map summarizing a dataset for which a hierarchical-level-of-detail (HLOD) structure is to be created, wherein the voxel density map comprises a voxel grid having a resolution lower than the dataset and each voxel in the voxel grid stores a sample count of data points within an area of the dataset associated with that voxel, and wherein the sample count of data points relates to graphics features of the dataset;
  subdividing the voxel density map into a hierarchy of bounding boxes; and
  determining leaf tiles based on the hierarchy of bounding boxes.

22. The non-transitory processor readable medium of claim 21, wherein the processor-readable instructions are configured to cause a processor of a computing device to perform operations further comprising:
  determining one or more groups of leaf tiles;
  generating one or more ancestor tiles for each of the one or more groups of leaf tiles; and
  storing both the one or more groups of leaf tiles and the generated one or more ancestor tiles together in the HLOD structure.

23. The non-transitory processor readable medium of claim 22, wherein the processor-readable instructions are configured to cause a processor of a computing device to perform operations further comprising generating a consecutive generation of leaf tiles associated with at least one of the one or more groups of leaf tiles, and
  wherein the processor-readable instructions are configured to cause a processor of a computing device to perform operations such that determining the one or more groups of leaf tiles, generating the one or more ancestor tiles for each of the one or more groups of leaf tiles, and generating the consecutive generation of leaf tiles are performed in a single pass over the dataset such that at least one of the one or more ancestor tiles is generated simultaneously with the consecutive generation of leaf tiles.

24. The non-transitory processor readable medium of claim 22, wherein the processor-readable instructions are configured to cause a processor of a computing device to perform operations such that:
  the one or more groups of leaf tiles comprises at least a first group of leaf tiles and a second group of leaf tiles;
  the one or more ancestor tiles comprise at least a first ancestor tile for the first group of leaf tiles and a second ancestor tile for the second group of leaf tiles; and
  two different processors are used to generate the first ancestor tile and second ancestor tile separately in parallel.

25. The non-transitory processor readable medium of claim 21, wherein the processor-readable instructions are configured to cause a processor of a computing device to perform operations such that determining leaf tiles based on the hierarchy of bounding boxes comprises:
  determining whether a candidate leaf tile exceeds a selected budget per tile; and
  subdividing the candidate leaf tile into two or more smaller leaf tiles in response to determining the candidate leaf tile exceeds the selected budget per tile.

26. The non-transitory processor readable medium of claim 21, wherein the processor-readable instructions are configured to cause a processor of a computing device to perform operations such that generating the voxel density map summarizing the dataset comprises:
  allocating the voxel grid having the resolution lower than the dataset; and
  streaming the dataset through the voxel grid using a rasterization approach to generate the voxel density map such that each voxel in the voxel grid stores the sample count of data points within the area of the dataset associated with that voxel.

27. The non-transitory processor readable medium of claim 26, wherein the processor-readable instructions are configured to cause a processor of a computing device to perform operations such that the graphics features of the dataset are streamed through the voxel grid triangle-by-triangle, position-by-position, or texel-by-texel.

28. The non-transitory processor readable medium of claim 21, wherein the processor-readable instructions are configured to cause a processor of a computing device to perform operations such that generating the voxel density map summarizing the dataset comprises generating the voxel density map in parallel processes associated with respective portions of the dataset, the parallel processes occurring on different processors, by:
  generating two independent voxel grids with the resolution lower than the dataset;
  streaming a first portion of the dataset through one of the two independent voxel grids on the first processor in parallel with streaming a second portion of the dataset through the other of the two independent voxel grids on the second processor to thereby generate a first voxel density map summarizing the first portion of the dataset and a second voxel density map summarizing the second portion of the dataset; and
  merging the first voxel density map summarizing the first portion of the dataset with the second voxel density map summarizing the second portion of the dataset to create the voxel density map summarizing the dataset.

29. The non-transitory processor readable medium of claim 21, wherein the processor-readable instructions are configured to cause a processor of a computing device to perform operations such that subdividing the voxel density map into the hierarchy of bounding boxes comprises:
  generating a pointcloud of densities based on the voxel density map; and
  performing data adaptive subdivision on the pointcloud to generate the hierarchy of bounding boxes.

30. The non-transitory processor readable medium of claim 21, wherein the processor-readable instructions are configured to cause a processor of a computing device to perform operations such that the dataset is a massive single material mesh dataset.

* * * * *